(12) United States Patent
Shatzkamer et al.

(10) Patent No.: US 9,413,655 B2
(45) Date of Patent: Aug. 9, 2016

(54) PROVIDING VIRTUAL PRIVATE SERVICE CHAINS IN A NETWORK ENVIRONMENT

(71) Applicant: CISCO TECHNOLOGY, INC., San Jose, CA (US)

(72) Inventors: Kevin D. Shatzkamer, Hingham, MA (US); James N. Guichard, New Boston, NH (US); Hendrikus G. P. Bosch, Aalsmeer (NL); Alessandro Duminuco, Milan (IT); Humberto J. La Roche, Ocean, NJ (US); Jeffrey Napper, Delft (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 113 days.

(21) Appl. No.: 14/304,043

(22) Filed: Jun. 13, 2014

(65) Prior Publication Data

US 2015/0365322 A1 Dec. 17, 2015

(51) Int. Cl.
*H04L 12/741* (2013.01)
*H04L 12/721* (2013.01)
*H04L 12/851* (2013.01)
*H04L 12/725* (2013.01)

(52) U.S. Cl.
CPC .............. *H04L 45/74* (2013.01); *H04L 45/306* (2013.01); *H04L 45/38* (2013.01); *H04L 47/2441* (2013.01); *H04L 47/2483* (2013.01)

(58) Field of Classification Search
CPC ..... H04L 45/74; H04L 45/38; H04L 47/2441; H04L 47/2483
See application file for complete search history.

(56) References Cited

U.S. PATENT DOCUMENTS

| | | | |
|---|---|---|---|
| 7,573,879 B2 | 8/2009 | Narad | |
| 7,895,425 B2 | 2/2011 | Khalid et al. | |
| 8,316,457 B1 | 11/2012 | Paczkowski et al. | |
| 8,612,612 B1 | 12/2013 | Dukes et al. | |
| 8,793,400 B2 | 7/2014 | McDysan | |
| 2008/0177896 A1* | 7/2008 | Quinn | G06F 9/5055 709/238 |
| 2009/0305699 A1* | 12/2009 | Deshpande | H04W 48/16 455/434 |
| 2010/0063988 A1 | 3/2010 | Khalid | |
| 2012/0281544 A1 | 11/2012 | Anepu | |
| 2013/0163594 A1* | 6/2013 | Sharma | H04L 45/64 370/392 |

(Continued)

OTHER PUBLICATIONS

U.S. Appl. No. 14/300,865, filed Jun. 10, 2014, entitled "Conveying Subscriber Information to Service Chain Services Using Tunnel Protocol Header Encapsulation for Mobile Network Applications in a Network Environment," Inventor(s): Humberto J. La Roche, et al.

(Continued)

*Primary Examiner* — Paul H Masur
(74) *Attorney, Agent, or Firm* — Patent Capital Group (57) ABSTRACT

A method provided in one embodiment includes receiving a first data packet of a data flow at a first classifier in which the first data packet includes a first identifier. The method further includes determining a second classifier associated with the first identifier in which the second classifier is further associated with at least one service chain of a service chain environment. The method still further includes forwarding the first data packet to the second classifier. The second classifier is configured to receive the first data packet, determine a particular service chain of the at least one service chain to which the first data packet is to be forwarded, and forward the first data packet to the particular service chain.

25 Claims, 7 Drawing Sheets

(56) References Cited

U.S. PATENT DOCUMENTS

| | | |
|---|---|---|
| 2014/0010085 A1 | 1/2014 | Kavunder et al. |
| 2014/0334295 A1* | 11/2014 | Guichard ............ H04L 47/2475 370/230 |
| 2014/0334488 A1* | 11/2014 | Guichard .............. H04L 45/306 370/392 |
| 2014/0362857 A1 | 12/2014 | Guichard |
| 2015/0003455 A1* | 1/2015 | Haddad ................... H04L 45/38 370/392 |
| 2015/0026362 A1* | 1/2015 | Guichard ................ H04L 45/30 709/242 |
| 2015/0092551 A1 | 4/2015 | Moisand |
| 2015/0131484 A1 | 5/2015 | Aldrin |
| 2015/0195197 A1* | 7/2015 | Yong ....................... H04L 45/74 370/392 |
| 2015/0215172 A1* | 7/2015 | Kumar ................... H04L 41/50 709/223 |
| 2015/0236948 A1* | 8/2015 | Dunbar ............... H04L 41/0654 370/225 |
| 2015/0271102 A1 | 9/2015 | Antich |
| 2015/0333930 A1* | 11/2015 | Aysola ................. H04L 12/5689 370/392 |

OTHER PUBLICATIONS

USPTO Oct. 16, 2015 Non-Final Office Action from U.S. Appl. No. 14/300,865.

Quinn, P., et al., "Network Service Header," Networking Working Group Internet Draft draft-quinn-nsh-00.txt, Jun. 13, 2013, 20 pages.

* cited by examiner

PROVIDING VIRTUAL PRIVATE SERVICE CHAINS IN A NETWORK ENVIRONMENT

TECHNICAL FIELD

This disclosure relates in general to the field of communications and, more particularly, to providing virtual private service chains in a network environment.

BACKGROUND

Networking architectures have grown increasingly complex in communication environments. An increasing emphasis exists on service providers offering infrastructure to provide for services such as multimedia or other services to mobile subscribers. In general terms, service providers may provide these services through the use of service chains. Service chains allow the chaining together of one or more services and/or appliances to provide for performing a particular service on a particular data flow associated with a particular subscriber. In addition, service providers often have a desire to offer use of the service chains to third-parties who may use various services and/or appliances of the service chain to realize a particular service that the third party wishes to offer to subscribers. In certain instances, the third party may wish to encrypt the data flow as it passes through the service chain. However, the third party may also desire that the service provider provide particular information associated with the subscriber to the third party in order to utilize the subscriber information within the service chain.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EXAMPLE EMBODIMENTS

Overview

A method is provided in one embodiment and includes receiving a first data packet of a data flow at a first classifier in which the first data packet includes a first identifier. The method further includes determining a second classifier associated with the first identifier in which the second classifier is further associated with at least one service chain of a service chain environment. The method still further includes forwarding the first data packet to the second classifier. The second classifier is configured to receive the first data packet, determine a particular service chain of the at least one service chain to which the first data packet is to be forwarded, and forward the first data packet to the particular service chain.

In specific embodiments, the second classifier is associated with a third party entity. In still other specific embodiments, the at least one service chain is private to the third party entity. In other specific embodiments, the first identifier is further associated with the third party entity. In still other specific embodiments, the at least one service chain includes one or more service functions that are private to the third party entity.

In specific embodiments, the first identifier is included within a network service header. In still other specific embodiments, the first identifier is included within a context header of the network service header. In other specific embodiments, the first classifier is associated with a service provider.

In still other specific embodiments, the second classifier is further configured to identify a particular application associated with the data flow and forward the data flow to the particular private service chain based upon the identified application.

Logic encoded in one or more non-transitory media is provided in one embodiment that includes code for execution and when executed by a processor operable to perform operations comprising receiving a first data packet of a data flow at a first classifier in which the first data packet includes a first identifier. The operations further include determining a second classifier associated with the first identifier in which the second classifier is further associated with at least one service chain of a service chain environment. The operations further include forwarding the first data packet to the second classifier. The second classifier is configured to receive the first data packet, determine a particular service chain of the at least one service chain to which the first data packet is to be forwarded, and forward the first data packet to the particular service chain.

A network element is provided in one embodiment and includes a memory element configured to store electronic code, a processor operable to execute instructions associated with the electronic code, a first classifier, and a second classifier in communication with the first classifier. The second classifier is further associated with at least one service chain of a service chain environment. The first classifier is configured to: receive a first data packet of a data flow, the first data packet including a first identifier; determine the second classifier associated with the first identifier; and forward the first data packet to the second classifier. The second classifier is configured to: receive the first data packet; determine a particular service chain of the at least one service chain to which the first data packet is to be forwarded; and forward the first data packet to the particular service chain.

Example Embodiments

Figure 1:
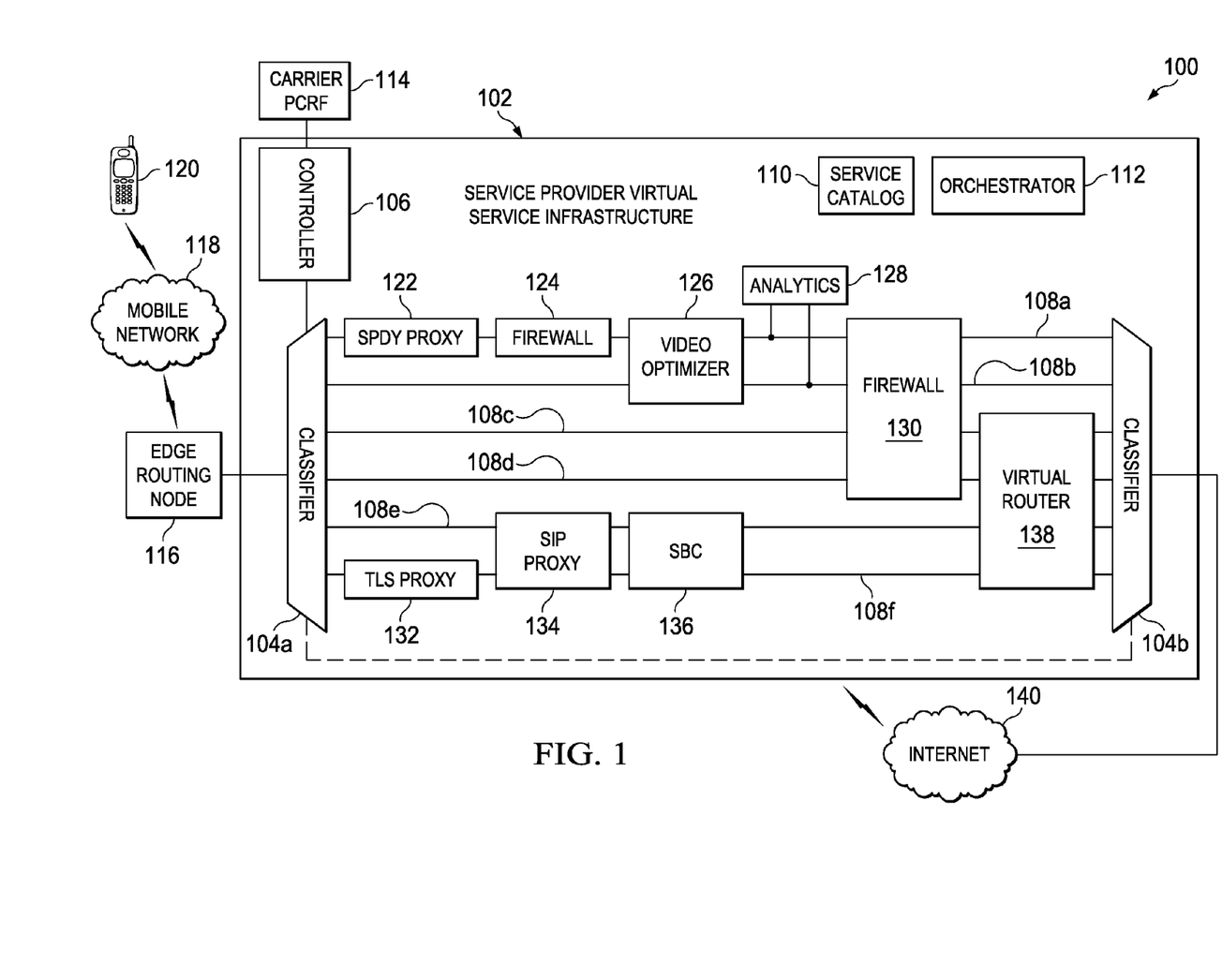
FIG. 1 is a simplified block diagram of a communication system for providing a virtual service chain in a network environment.

Referring now to FIG. 1, FIG. 1 is a simplified block diagram of a communication system 100 for providing a virtual service chain in a network environment. Communication system 100 includes a service provider virtual service infrastructure 102 including a first classifier 104a and a second classifier 104b, a policy controller 106, a first service chain 108a, a second service chain 108b, a third service chain 108c, a fourth service chain 108d, a fifth service chain 108e, and a sixth service chain 108f, a service catalog 110, and an orchestrator 112. Communication system 100 further includes a carrier policy and charging rules function (PCRF) 114, an edge routing node 116, a mobile network 118, user equipment (UE) 120, and the Internet 140. In communication system 100 of FIG. 1, the entire service chain is controlled by the carrier or service provider.

First classifier 104a is in communication with the beginning of each of first service chain 108a, second service chain 108b, third service chain 108c, fourth service chain 108d, fifth service chain 108e, and sixth service chain 108f. Second classifier 104b is in communication with the end of each of first service chain 108a, second service chain 108b, third service chain 108c, fourth service chain 108d, fifth service chain 108e, and sixth service chain 108f. In addition, first classifier 104a and second classifier are in direct communication with one another. PCRF controller 106 is in communication with first classifier 104a and carrier PCRF 114. Service provider virtual service infrastructure 102 is in communication with edge routing node 116 and the Internet 140. Edge routing node 116 is in further communication with mobile network 118. UE 120 is in wireless communication with mobile network 118.

UE 120 is configured to include a cellular radio capable of communicating with mobile network 118. UE 120 may be associated with a client, customer, or subscriber wishing to initiate a communication in communication system 100 via some network. The term 'user equipment' is interchangeable with the terminology 'endpoint' and 'wireless device', where such terms are inclusive of devices used to initiate a communication, such as a computer, a personal digital assistant (PDA), a laptop or electronic notebook, a cellular telephone, an i-Phone, an i-Pad, a Google Droid, an IP phone, or any other device, component, element, or object capable of initiating voice, audio, video, media, or data exchanges within communication system 100.

UE 120 may also be inclusive of a suitable interface to the human user, such as a microphone, a display, a keyboard, or other terminal equipment. UE 120 may also be any device that seeks to initiate a communication on behalf of another entity or element, such as a program, a database, or any other component, device, element, or object capable of initiating an exchange within communication system 100. Data, as used herein in this document, refers to any type of numeric, voice, video, or script data, or any type of source or object code, or any other suitable information in any appropriate format that may be communicated from one point to another.

First service chain 108a includes a SPDY proxy 122, a first firewall 124, a video optimizer 126, an analytics module 128, and a second firewall 130. Second service chain 108b includes video optimizer 126, analytics module 128, and second firewall 130. Third service chain 108c includes the second firewall 130 and a virtual router 138. Fourth service chain 108d includes second firewall 130 and virtual router 138. Fifth service chain 108e includes a Session Initiation Protocol (SIP) proxy 134, a session border controller (SBC) proxy 136, and virtual router 138. Sixth service chain 108f includes a Transport Layer Security (TLS) proxy 132, SIP proxy 134, SBC 136, and virtual router 138. In one or more embodiments, first service chain 108a, second service chain 108b, third service chain 108c, fourth service chain 108d, fifth service chain 108e, and sixth service chain 108f are virtual service chains. In still other embodiments, one or more of first service chain 108a, second service chain 108b, third service chain 108c, fourth service chain 108d, fifth service chain 108e, and sixth service chain 108f may be physical service chains.

User equipment 120 is configured to send data packets associated with a particular data flow to edge routing node 116 via mobile network 118. In one or more embodiments, edge routing node 116 may include a gateway, a router, or any other suitable routing device. In particular embodiments, edge routing node 116 may include one or more of an LTE packet gateway (PGW), a 3G Gateway GPRS support node (GGSN), an enhanced High Rate Packet Data (eHPRD) HRPD Serving Gateway (HSGW), an Multiprotocol Label Switching (MPLS) provider edge (PE), a cable modem termination system, and a wireline Broadband Remote Access Server (BRAS). Edge routing node 116 is configured to route the data packets associated with the data flow to first classifier 104a.

First classifier 104a is configured to receive the data packets of the data flow sent from UE 120 and route the data packets to the appropriate service chain among first service chain 108a, second service chain 108b, third service chain 108c, fourth service chain 108d, fifth service chain 108e, and sixth service chain 108f. In particular embodiments, first classifier 104a determines the particular service chain to direct a particular data flow to based upon information contained within a network service header of the packets of the data flow. After one or more services are performed on the data flow by one of first service chain 108a, second service chain 108b, third service chain 108c, fourth service chain 108d, fifth service chain 108e, and sixth service chain 108f, second classifier 104b routes the data packets of the data flow to the Internet 140.

Carrier PCRF 114 is configured to provide policy information associated with a subscriber of user equipment 120 to policy controller 106. Policy controller 106 is configured to interact with first classifier 104a and implement one or more policy actions upon the data flow. Service catalog 110 is configured to maintain a list of services offered by service provider virtual service infrastructure 102 using the first service chain 108a, second service chain 108b, third service chain 108c, fourth service chain 108d, fifth service chain 108e, and sixth service chain 108f. Orchestrator 112 is configured to perform various resource management functions within a virtualized environment such creating the virtualized environment.

As new business-to-business (B2B) models develop between network operators and enterprise, media, and over-the-top (OTT) organizations, the need to support these B2B models with a scalable technology solution has become increasingly important. New business models are focused on developing cooperative agreements, allowing network operator functions to be leveraged by the enterprise, media, and OTT organizations, under operational control of those organizations. Such functions might include (but not limited to): video optimizers and encoders; Deep Packet Inspectors; and security appliances, such as firewalls and session border controllers; application layer proxies (for example, SPDY, HTTPS, HTTP, and SIP). In addition, the desire to also integrate into network operators OSS/BSS systems to enable transport-level functions such as invocation of specific QoS or multicast/broadcast capabilities, allows network operators to extend complete end-to-end solutions that enterprise, media, and OTT organizations can leverage as an access-aware cloud service.

Today's systems work largely independently of each other, and access awareness as a data point for enabling external organizations to improve their business in at least three ways: closely align the creation of content, especially video, to the conditions on the access network in real-time; correlate network conditions with usage to better diagnose root-cause of poor experiences; and extend the reach of their IT security rules into the carrier infrastructure by enforcing enterprise-specific firewall rules as close to their remote users access as possible.

Various embodiments described herein provide for the creation and instantiation of dynamically-classified virtual private service chains. The virtual private service chains may allow external organizations to meet the business benefits above as well as other benefits In accordance with various embodiments, a nested service chaining solution is implemented which is based on leveraging an intelligent classifier within a public service chain that maps traffic into a private service chain. This private service chain may include a private classification engine with defined rules enabled by a third party, dedicated virtual instances of network services, expressed in a service catalog, that are chained together based on private classification information. In accordance with various embodiments, the private classification information is conveyed within private Network Service Header (NSH) fields.

Figure 2:
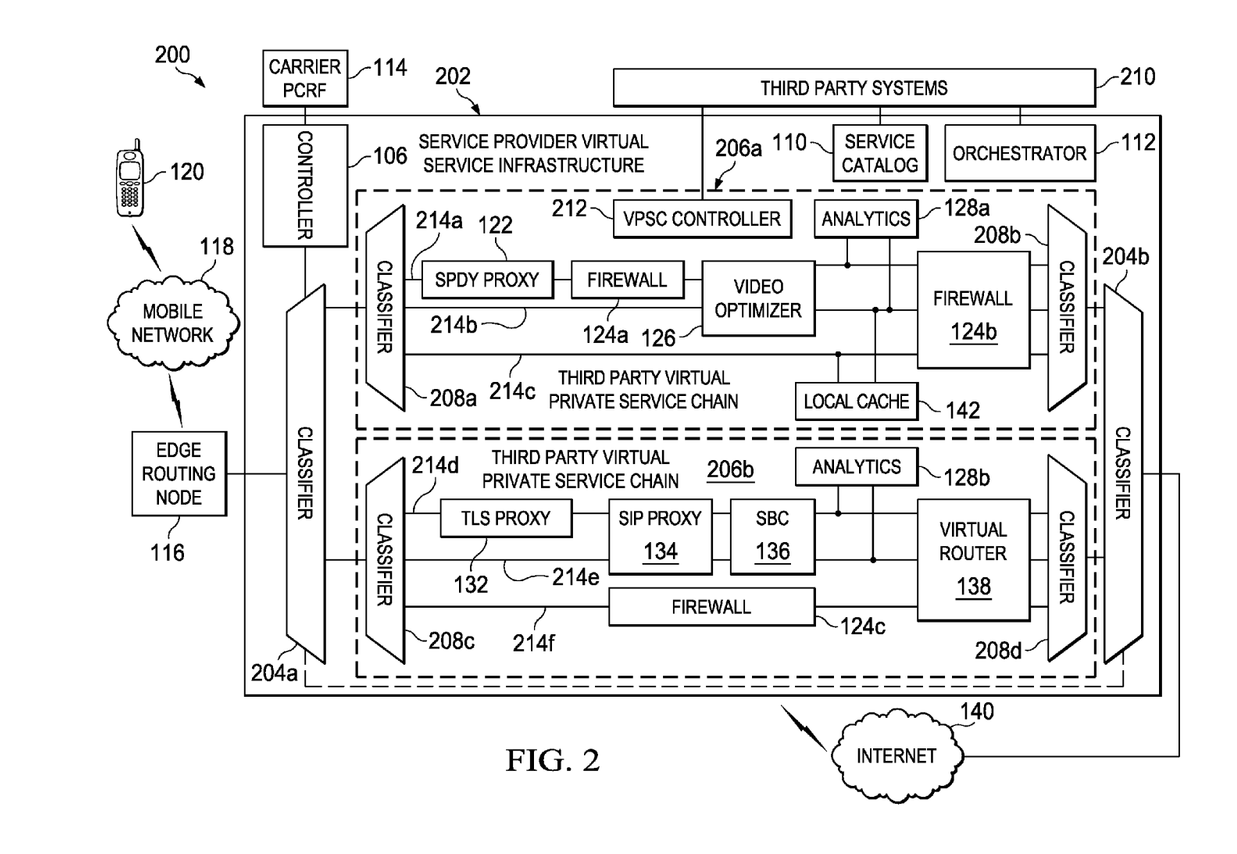
FIG. 2 is a simplified block diagram of a communication system for providing virtual private service chains in a network environment in accordance with one embodiment.

Referring now to FIG. 2, FIG. 2 is a simplified block diagram of a communication system 200 for providing virtual private service chains in a network environment in accordance with one embodiment. Communication system 200 includes a service provider virtual service infrastructure 202 including a first public classifier 204a, a second public classifier 204b, a policy controller 106, a first third-party virtual private service chain environment 206a, a second third-party virtual private service chain environment 206b, a virtual private service chain (VPSC) controller 212, a service catalog 110, and an orchestrator 112. First third-party virtual private service chain environment 206a includes a first private classifier 208a, a second private classifier 208b, a first private service chain 214a, a second private service chain 214b, and a third private service chain 214c. Second third-party virtual private service chain environment 206b includes a third private classifier 208c, a fourth private classifier 208d, a fourth private service chain 214d, a fifth private service chain 214e, and a sixth private service chain 214f. Communication system 200 further includes a carrier policy and charging rules function (PCRF) 114, an edge routing node 116, a mobile network 118, user equipment (UE) 120, and the Internet 140. In one or more embodiments, service provider virtual service infrastructure 202 may include a single access point name (APN) for all services located at a gateway such as a GGSN/PGW.

First public classifier 204a is in communication with each of first private classifier 208a and third public classifier 208c, and second public classifier 204b is in communication with each of second private classifier 208b and fourth private classifier 208d. First private classifier 208a is in communication with the beginning of each of first private service chain 214a, second private service chain 214b, and third private service chain 214c. Second private classifier 208b is in communication with the end of each of first private service chain 214a, second private service chain 214b, and third private service chain 214c. Third private classifier 208c is in communication with the beginning of each of fourth private service chain 214d, fifth private service chain 214e, and sixth private service chain 214f. Fourth private classifier 208d is in communication with the end of each of fourth private service chain 214d, fifth private service chain 214e, and sixth private service chain 214f. In addition, first classifier 104a and second classifier are in direct communication with one another.

One or more third party systems 210 are in communication with VPSC controller 212, service catalog 110, and orchestrator 112. Third party systems 210 are associated with one or more third party entities. PCRF controller 106 is in communication with first public classifier 204a and carrier PCRF 114. Service provider virtual service infrastructure 202 is in communication with edge routing node 116 and the Internet 140. Edge routing node 116 is in further communication with mobile network 118. UE 120 is in wireless communication with mobile network 118.

First private service chain 214a includes a SPDY proxy 122, a first firewall 124a, a video optimizer 126, a first analytics module 128a, and a second firewall 124b. Second private service chain 214b includes video optimizer 126, first analytics module 128a, and second firewall 124b. Third private service chain 214c includes second firewall 124b, a local cache 142, and second firewall 124b. Fourth private service chain 214d includes a Transport Layer Security (TLS) proxy 132, a Session Initiation Protocol (SIP) proxy 134, a session border controller (SBC) proxy 136, a second analytics module 128b, and a virtual router 138. Fifth private service chain 214e includes SIP proxy 134, SBC 136, second analytics module 128b, and virtual router 138. Sixth private service chain 2141 includes a third firewall 124c, and virtual router 138. In one or more embodiments, first private service chain 214a, second private service chain 214b, third private service chain 214c, fourth private service chain 214d, fifth private service chain 214e, and sixth private service chain 214f are virtual service chains. In still other embodiments, one or more of first private service chain 214a, second private service chain 214b, third private service chain 214c, fourth private service chain 214d, fifth private service chain 214e, and sixth private service chain 214f may be physical service chains.

First public classifier 204a is configured to receive data packets of a data flow sent from UE 120, and determine whether the data packets should be routed to first private classifier 208a associated with first third-party virtual private service chain environment 206a or third private classifier 208c associated with second third-party virtual private service chain environment 206b. First public classifier 204a is further configured to route the packets to either first private classifier 208a or third private classifier 208c based upon the determination. In accordance with one or more embodiments, first public classifier 204a includes public classification rules used to determine whether particular data packets are to be directed to either first private classifier 208a or third private classifier 208c. In particular embodiments, first public classifier 204a determines whether to direct a particular data flow to either first private classifier 208a or third private classifier 208c based upon information contained within a network service header of the packets of the data flow. In one particular embodiment, the network service header may contain an organization identifier that is associated with an uniquely identifies the particular third party entity associated with a particular third-party virtual private service chain. In still other particular embodiments, information such as a source IP address, destination address, SSL header, IP header, TCP header or other information may be used by first public classifier to determine to which private classifier the traffic associated with a particular data flow should be directed. In some embodiments, the network service header may be encapsulated with data from a service provider system such as carrier PCRF 114.

In accordance with particular embodiments, first public classifier 204a is unaware of the content of the data packets other than being aware of which of first private classifier 208a and third private classifier 208c to which the packet of the data flow are to be directed. In some embodiments, one or more portions of the data content may be encrypted and one or more components, services, or functions of first third-party virtual private service chain environment 206a and second third-party virtual private service chain environment 206b may be configured to decrypt the encrypted content. First private classifier 208a and third private classifier 208c each include private classification rules used to determine which particular private service chain the traffic is to be directed. In a particular embodiment, one or more of first private classifier 208a and third private classifier 208c may be configured to utilize private classification rules to identify a particular application associated with the data flow and forward the data flow to the particular private service chain based upon the identified application.

Third party systems 210 are configured to allow a third party to interact with VPSC controller 212 to control and maintain various aspects of first third-party virtual private service chain environment 206a and second third-party virtual private service chain environment 206b such as the service functions that are offered by each private service chain and the private rules to determine the particular private service chain to which the data traffic is to be directed. In one or more embodiments each of first third-party virtual private service chain environment 206a and second third-party virtual private service chain environment 206b may include a VPSC controller 212 that is logically separated from one another and each may have a unique virtual machine, unique Vswitch ports, unique service instances, etc.

In a particular embodiment, first third-party virtual private service chain environment 206a is associated with an controlled by a Company A, and second third-party virtual private service chain environment 206b is associated with an controlled by a Company B. Accordingly, Company A can control the services and/or functions offered by each of private service chains 214a-214c of first third-party virtual private service chain environment 206a as well as the private classification rules associated with first private classifier 208a used to determine the particular one of private service chains 214a-214c to which particular data traffic received from first public classifier 204a will be routed. Similarly, Company B can control the services and/or functions offered by each of private service chains 214d-214f of second third-party virtual private service chain environment 206b as well as the private classification rules associated with control the services and/or functions offered by each private service chains 214d-214f of second third-party virtual private service chain environment 206b as well as the private classification rules associated with third private classifier 208c used to determine the particular one of private service chains 214d-214f to which particular data traffic received from first public classifier 204a will be routed. As a result, Company A and Company B can apply their own respective private service chain functions to particular data flows.

Carrier PCRF 114 is configured to provide policy information associated with a subscriber of user equipment 120 to policy controller 106. Policy controller 106 is configured to interact with first public classifier 204a and implement one or more policy actions upon the data flow. Service catalog 110 is configured to maintain a list of virtual services offered by service provider virtual service infrastructure 202 using private service chains 214a-214f. Orchestrator 112 is configured to perform various resource management functions within a virtualized environment such creating the virtualized environment.

In accordance with various embodiments, PCRF controller 106 and carrier PCRF 114 allows first public classifier 204a to insert additional information into the headers for use by private service chains 214a-214f. For example, if either of first third-party virtual private service chain environment 206a and second third-party virtual private service chain environment 206b want to obtain congestion information associated with the radio network, information on the subscriber's billing plan, information on whether the subscriber is a prepaid user or post-paid user and/or other information associated with the subscriber, this information may be embedded by first public classifier 204a into a header of the data flow. First private classifier 208a and/or second private classifier 208b can extract the information and use the information make different decisions regarding how the services or functions of the particular private service chain are to operate upon the data flow.

After one or more services are performed on the data flow by one of private service chains 214a-214c, second private classifier 208b routes the data packets to second public classifier 204b, and second public classifier 204b routes the data packets of the data flow to the Internet 140. Similarly, after one or more services are performed on the data flow by one of private service chains 214d-214f, fourth private classifier 208d routes the data packets to second public classifier 204b, and second public classifier 204b routes the data packets of the data flow to the Internet 140.

In communication system 200 of FIG. 2, private service chains 214a-214f are under control of one or more third parties. In particular embodiments, first private classifier 208a, second private classifier 208b, third private classifier 208c, and fourth private classifier 208d are each dedicated instances of a classifier within the service provider virtual service infrastructure 202.

In a particular example instantiation, a media company requests a media-specific service chain consisting of a SPDY proxy function 122, first firewall 124a, and video optimizer 126 as a mechanism to optimize SPDY-encapsulated media based on access network conditions. The system is operable to integrate with internal policy, identity, and analytics systems to understand the mapping between user, location, and network conditions. The media company requests the instantiation of their own private service chain that provides the following: (1) for traffic destined to subscriber, terminate SPDY, allowing for the exposure of the individual HTTP/ABR sessions contained within. Should the SPDY session carry HTTPS, the service chain may optionally include a SSL function operable within the media company's SSL sandbox; (2) for each unoptimized HTTP/ABR session, provide media encode/transcode/optimization services based on user, location, and network conditions; (3) for each optimized HTTP/ABR session, re-encapsulate traffic with SPDY header information for transmission to customer; and (4) enable both Internet-side and client-side firewalls which allow only SPDY sessions to be sent through service chain.

In this example instantiation, the requirement of the overall system is to: (1) define public classifier rules that steer traffic into the private service chain; (2) enable first public classifier 204a, through interactions with network operator OSS/BSS systems, to embed information relevant to the private service chain in all packet headers; (3) define and instantiate private instances of virtual functions, including SPDY Proxy, Firewall, video optimizer, and optionally, SSL function; and (4) define private classification rules that map virtual private functions into a virtual private service chain. In particular examples private classification rules may be transferred from the third party systems 210 either via external API to an orchestration system or embedded in network service header from the client-side. When transmitted from the client-side, the private classification rules may be individually encrypted with an algorithm that is agreed-upon between the node that inserts the network service header and the private classification function. In particular examples, the private service chain may be defined through the individual virtual private functions using network service headers. The NSH header fields may be individually encrypted with an algorithm that is agreed-upon between the node that inserts the network service header and the private classification function.

In another particular example instantiation, an OTT cloud voice service (SIP-based) seeks to localize peer-to-peer communications which requires identification that two users are both local to the system, enforcement of proper security rules, and analytics on call quality. The OTT cloud voice service may request the instantiation of its own private service chain that provides the following: (1) for each SIPS session initiating from a client, decrypt TLS header using private certificate from OTT cloud voice service; (2) for each unencrypted SIP session, inspect SIP headers to determine the location of the called party and whether the call can be localized; (3) install a routing rule to send traffic directly between the SIP endpoints; (4) re-encrypt the SIP session using private certificate from OTT cloud voice service; (5) store session information and localize-able calls so that subsequent packets for the session may be directly routed; and periodically send correlated data records, including both SIP information and network information to the OTT cloud voice service provider.

In this example instantiation, the requirement of the overall system is to: (1) define public classifier rules that steer traffic into the private service chain; (2) enable public classifier, through interactions with network operator OSS/BSS systems, to embed information relevant to the private service chain in all packet headers; (3) define and instantiate private instances of virtual functions, including TLS encryption/decryption function, SIP proxy function, Session Border Controller Function, analytics function, and virtual routing function; and (4) define private classification rule that maps virtual private functions into a virtual private service chain. Private classification rules may be transferred from the third party either via external API to an orchestration system or embedded in network service header from the client-side. When transmitted from the client-side, the private classification rules may be individually encrypted with an algorithm that is agreed-upon between the node that inserts the network service header and the private classification function. In particular examples, the private service chain may be defined through the individual virtual private functions using network service headers. The NSH header fields may be individually encrypted with an algorithm that is agreed-upon between the node that inserts the NSH header and the private classification function.

Other example instantiations may leverage different virtual private functions but contain the same operational functions as the examples described above detailed above might include: a bring-your-own-device (BYOD) security function including virtual instances of a firewall, Intrusion Prevention Systems (IPS)/Intrusion Detection Systems (IDS), and virtual router which may be configured to black-hole traffic from distributed denial-of-service (DDoS) attacks; an analytics function including a virtual data aggregation function, which correlates information from public NSH headers with information available via private Deep Packet Inspection, and reports information back to the third party.

In particular embodiment, the orchestration function provided by orchestrator 112 may be requested to create both the virtual environment (compute, storage, network) and virtual private functions. In other particular embodiments, the public classifiers are operable to understand which header information is public (available to all virtual private service chains) and which information is private (only sent to relevant virtual private service chains). In various embodiments, the public classifier is inoperable to understand the content of the encrypted private header information. In still other particular embodiments, the private classifiers are operable to understand both public and private header information, and to decrypt the content of its own organization's private headers. In particular embodiments, each private classifier is inoperable to understand the content of other organization's private headers.

Various embodiments described herein provide for virtual private network in which network function virtualization and network service headers are leveraged to define virtual private service chains. In at least one embodiment, nested service chains are provided in which the initial chain is the public classifier to private classifier chain, and the secondary chain is the private classifier to private service function chain. In accordance with various embodiments, traffic will not be processed by the private classifier unless it was initially classified by the public classifier and forwarded to the private classifier by that entity. One or more embodiments may provide an advantage of a consistent and scalable way for network operators to deploy access-intelligent cloud services which may be especially relevant in mobile environments where the access network fluctuates drastically and frequently.

Figure 3:
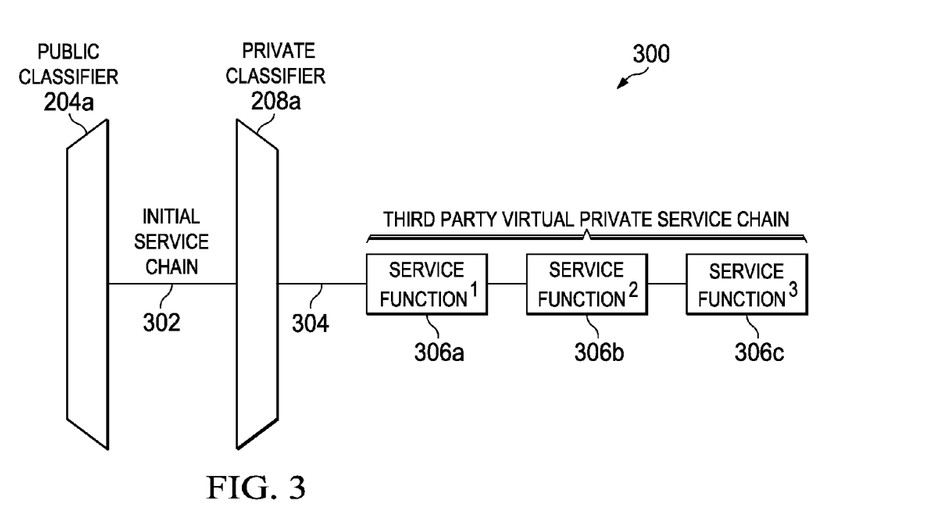
FIG. 3 is a simplified block diagram of a virtual service chain according to one embodiment.

Referring now to FIG. 3, FIG. 3 is a simplified block diagram of a virtual service chain 300 according to one embodiment. Virtual service chain 300 includes first public classifier 204a coupled to first private classifier 208a via a initial service chain 302. First private classifier 208a is further coupled to a third party virtual private service chain 304. Third party virtual private service chain 304 includes a first service function 306a, a second service function 306b, and a third service function 306c.

As discussed hereinabove, first public classifier 204a directs traffic on to initial service chain 302 that terminates at first private classifier 208a. Initial classification is used by first public classifier 204a to identify traffic that is associated with the organization (or third party) that is responsible for first private classifier 208a. In a particular embodiment, a NSH header is used in data packets sent from first public classifier 204a and private classifier 208a to contain information identifying the particular private classifier, such as first private classifier 208a, to which the data packets are to be directed. In other particular embodiments, additional context metadata may be passed from first public classifier 204a to first private classifier 208a through initial service chain 302. The additional context metadata may be used by first private classifier 208a and/or one or more of first service function 306a, second service function 306b, and third service function 306c. First private classifier 208a applies subsequent classification to the data packets to direct the data packets to third party virtual private service chain 304. In particular embodiments, first private classifier 208a may forward a network service header and/or associated context metadata to one or more of first service function 306a, second service function 306b, and third service function 306c of third party virtual private service chain 304.

Figure 4:
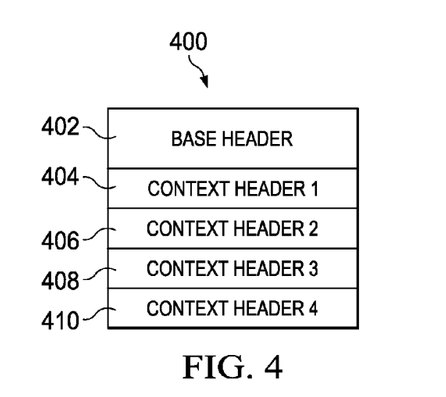
FIG. 4 is a simplified block diagram of a network service header (NSH) according to one embodiment.

Referring now to FIG. 4, FIG. 4 is a simplified block diagram of a network service header (NSH) 400 according to one embodiment. Network service header 400 includes a base header 402, a first context header 404, a second context header 406, a third context header 408, and a fourth context header 410. In at least one embodiment, base header 402 includes an indication of the protocol type of the data packet, a service index that is decremented by service nodes after performing required services, and a service path identifier to identify a particular service path. Base header 402 facilitates service chaining by allowing traffic to be sent between different services in a service chain (e.g., DPI, NAT, firewall, etc.). In accordance with various embodiments, one or more of first context header 404, second context header 406, third context header 408, and fourth context header 410 may include an identifier associated with a particular private classifier used by a particular public classifier to determine whether to route a data flow to the particular private classifier.

Figure 5:
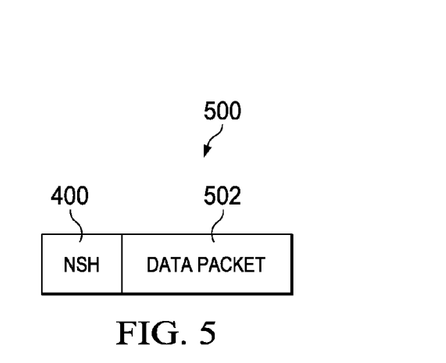
FIG. 5 is a simplified block diagram of a packet including a data packet having an embedded network service header (NSH) according to one embodiment.

Referring now to FIG. 5, FIG. 5 is a simplified block diagram of a packet 500 including a data packet having an embedded network service header (NSH) according to one embodiment. Packet 500 includes a network service header 400 appended to a data packet 502. Network service header 400 includes identifying information associated with a particular private classifier. Data packet 502 includes a data packet associated of a data flow associated with the subscriber which is to be directed by a private classifier to a particular private service chain. In a particular embodiment, data packet 502 may be an encrypted data packet while network service header 400 is unencrypted. In still another particular embodiment, data packet 502 may be an unencrypted data packet.

Figure 6:
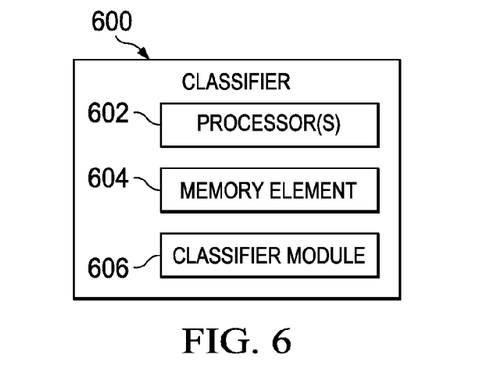
FIG. 6 is a simplified block diagram of classifier in accordance with one embodiment.

Referring now to FIG. 6, FIG. 6 is a simplified block diagram of classifier 600 in accordance with one embodiment. In particular embodiments, classifier 600 may be used to implement one or more instances of first public classifier 204a, second public classifier 204b, first private classifier 208a, second private classifier 208b, third private classifier 208c, and fourth private classifier 208d. Classifier 600 includes one or more processors 602, a memory element 604, and a classifier module 606. Processor 602 is configured to execute various tasks of classifier 600 as described herein and memory element 604 is configured to store data associated with classifier 600. Classifier module 506 is configured to perform the various public and/or private classification functions of one or more of first public classifier 204a, second public classifier 204b, first private classifier 208a, second private classifier 208b, third private classifier 208c, and fourth private classifier 208d as described herein.

In one example implementation, classifier 600 is a network element that facilitates or otherwise helps coordinate data flow classification activities (e.g., for networks such as those illustrated in FIG. 2). As used herein in this Specification, the term 'network element' is meant to encompass network appliances, servers, routers, switches, gateways, bridges, loadbalancers, firewalls, processors, modules, base stations, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, classifier 600 includes software to achieve the operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

Figure 7:
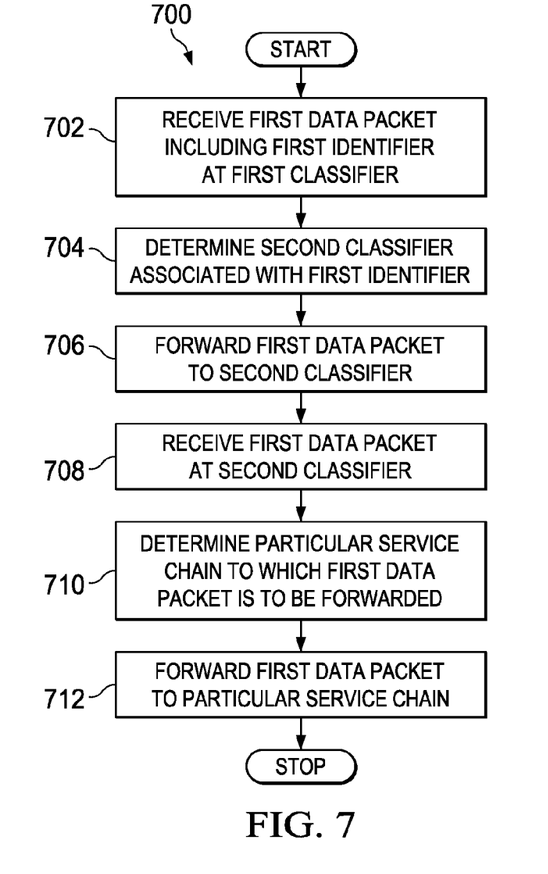
FIG. 7 is a simplified flow diagram depicting a flow associated with the communication system of FIG. 2 according to one embodiment.

Referring now to FIG. 7, FIG. 7 is a simplified flow diagram depicting a flow 700 associated with communication system 200 of FIG. 2 according to one embodiment. In 702, a first classifier receives a first data packet of a data flow in which the first data packet includes a first identifier. In a particular embodiment, the first classifier includes first public classifier 204a. In 704, the first classifier determines a second classifier associated with the first identifier in which the second classifier is further associated with at least one service chain of a service chain environment. In a particular embodiment, the second classifier includes first private classifier 208a and the service chain environment includes first third-party virtual private service chain environment 206a. In 706, the first classifier forwards the first data packet to the second classifier. In 708, the second classifier receives the first data packet. In 710, the second classifier determines a particular service chain of the at least one service chain to which the first data packet is to be forwarded. In 712, the second classifier forwards the first data packet to the particular service chain and flow 700 ends. In particular embodiments, the second classifier is further configured to identify a particular application associated with the data flow and forward the data flow to the particular private service chain based upon the identified application.

In particular embodiments, the second classifier is associated with a third party entity. In still other particular embodiments, the at least one service chain is private to the third party entity. In other particular embodiments, the first identifier is further associated with the third party entity. In still other particular embodiments, the at least one service chain includes one or more service functions that are private to the third party entity.

In some particular embodiments, the first identifier is included within a network service header. In still other particular embodiments, the first identifier is included within a context header of the network service header. In still other particular embodiments, the first classifier is associated with a service provider.

One way to allow mobile network operators to monetize their network is to expose to third parties an interface that would allow them to interact with the network. This interaction may take place in two different ways: (1) the third party can retrieve information residing in the network, such as geo-location information, subscriber identity, subscriber category, radio link condition etc. or (2) the third party can influence the way the network behaves for a specific subscriber, such as prioritizing traffic, imposing particular policies or charging rules, etc. In both cases the third parties may take advantage of such interactions to create a new or a better service to their own customers (which happen to be also mobile subscribers in the considered network). Some examples may include: providing location based services; modifying service behavior based on network conditions, e.g. increase the compression rate used for video when the network is congested; identifying a subscriber using the subscriber's mobile network identity, etc.

Various embodiments provide for a method to implement this interaction based on the introduction of an external policy engine, which can be seen as an external Policy and Charging Rules Function (PCRF) residing in the third party's network. The external PCRF interacts with an internal PCRF through a service node installed in the Gi-LAN infrastructure of the mobile operator. Such a service node, called a policy controller, may act as a proxy between the external and the internal PCRF.

Existing methods to achieve similar objectives consist mainly in the creation of a set of APIs through which an external party can control some of the functionality of the network. In accordance with various embodiments, the introduction of the policy controller may include ore more of the following relevant characteristics: it is located in the Gi-LAN, which means that it exists on the data plane allowing a per-flow policy enforcement and an enforcement that depends on the specific flow characteristics (even based on Shallow or Deep Packet Inspection). Moreover it may allow for the establishment of a volume-based billing relationship between the network operator and the third party. In accordance with various embodiments, the policy control can be specific and customized for a given third party. This allows higher control from the third party which can implement behaviors that are customized for the specific third party use cases. The interaction between the policy controller and the rest of the network can occur with proprietary interfaces exposed by the network operator or standard APIs.

In particular embodiments, in the service routed infrastructure used by a mobile service provider, the chain of services can alter traffic between mobile nodes and remote services. All packets from and to the mobile node may be subjected to one or more of these services. Services range from mobile line termination, lawful interception, charging, as well as application-specific (in-line) services such as HTTP proxies, TCP optimizers, firewalls and NA(P)T functions. As described above, the chain of services resides between the mobile access and the public Internet and is usually referred to as the Gi-LAN.

In one or more embodiments, the external policy engine (PCRF) provided by third parties allows management of policy interactions between the mobile service provider's subscriber policies and the policies provided by third parties. In accordance with various embodiments, the policies between the two parties are translated by means of a policy controller installed as a service within the Gi-LAN.

Figure 8:
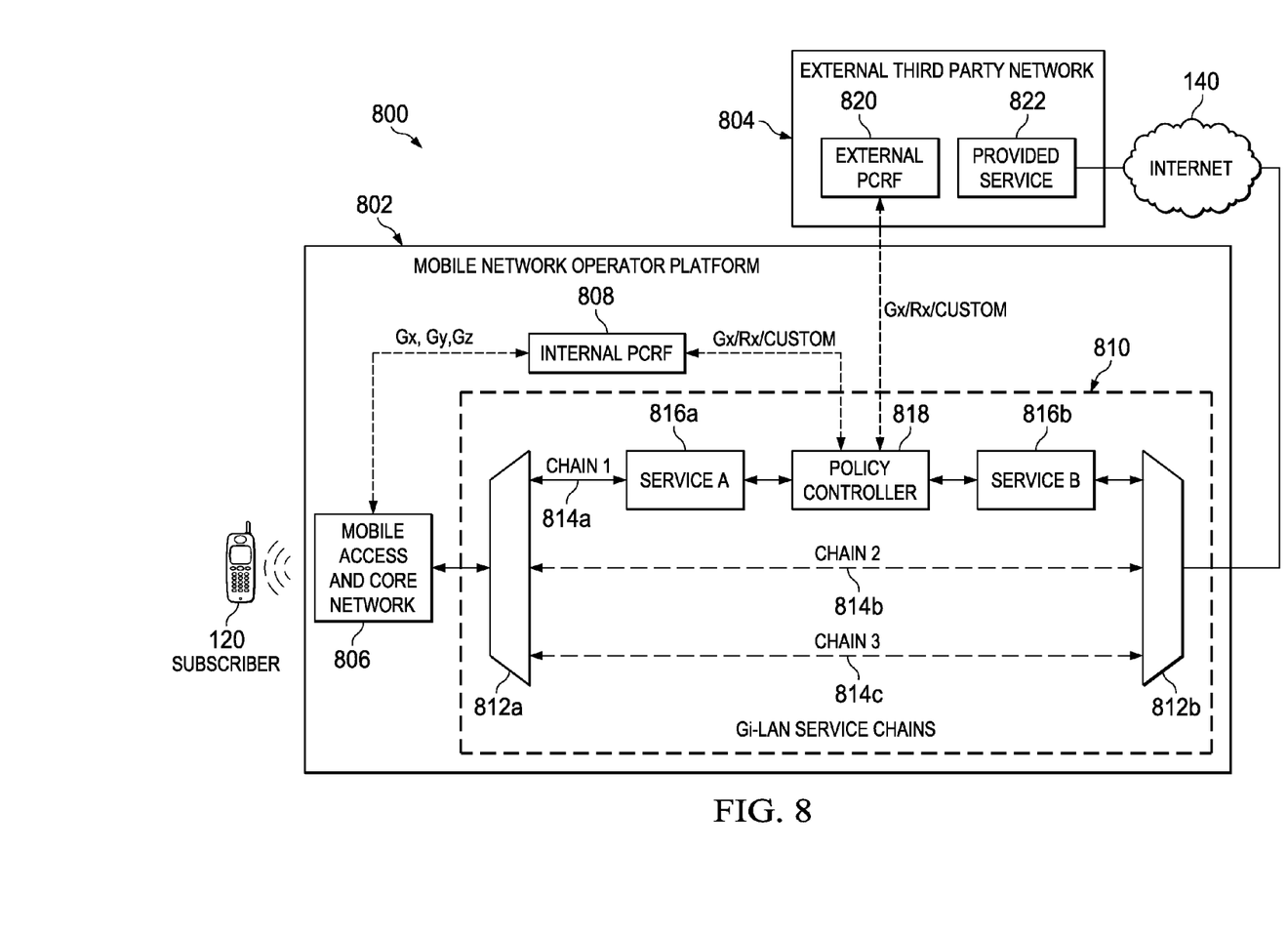
FIG. 8 is a simplified block diagram of a communication system for providing third party control in a network environment in accordance with one embodiment.

Referring now to FIG. 8, FIG. 8 is a simplified block diagram of a communication system 800 for providing third party control in a network environment in accordance with one embodiment. Communication system 800 includes a mobile network operator platform 802 in communication with an external third party network 804. Mobile network operator platform 802 includes a mobile access and core network 806, an internal PCRF, and Gi-LAN service chains 810. Mobile access and core network 806 and is in communication with internal PCRF 808 and Gi-LAN service chains 810, and internal PCRF is further in communication with Gi-LAN service chains 810. Mobile access and core network 806 is in wireless communication with UE 120 associated with a particular subscriber.

Gi-LAN service chains 810 include a first classifier 812a, a first service chain 814a, a second service chain 814b, a third service chain 814c, and a second classifier 814b. First classifier 812a is in communication with mobile access and core network 806 and a front end of each of first service chain 814a, second service chain 814b, and third service chain 814c. The second classifier 812b is communication with a back end of each first service chain 814a, second service chain 814b, and third service chain 814c. Second classifier 812b is in further communication with the Internet 140. In the particular embodiment illustrated in FIG. 8, first service chain 814a further includes a first service 816a, a policy controller 818, and a second service 816b. Policy controller 818 is in communication with internal PCRF 808.

External third party network 804 includes an external PCRF 820 and a provide service 822. External PCRF 820 is in communication with policy controller 818 of first service chain 814a. Provided service 822 is in communication with the Internet 140 and represents a service provided to the subscriber associated with UE 120 and exposed over the Internet 822.

Mobile access and core network 806 are controlled by internal PCRF 808 which is an operator managed PCRF. In particular embodiments, interactions with internal PCRF 808 take place over diameter interfaces, such as Gx and Rx interfaces as per 3GPP specifications. The various chains of inline services provided in the Gi-LAN by first service chain 816a, second service chain 816b, and third service chain 816c offer services that are traversed by traffic going from UE 120 to the Internet 140. Among the inline services, the policy controller 818 has an interface towards internal PCRF 808 and another interface towards external PCRF 820 hosted in third party network 804. In particular embodiments, external PCRF 820 (or another policy engine), interacts with the policy controller 818 to retrieve subscriber/network information and impose policy or charging rules upon data packets within first service chain 814.

In an example specific use case, an external third party wants to trigger traffic prioritization on a flow from a given subscriber to a service hosted by the third party itself in which the service is consumed over a regular TCP or UDP connection. According to a particular embodiment, the subscriber opens a connection towards the webserver hosting the service. The traffic associated with this connection is routed over first service chain 814a. Thus all the packets of such a connection traverse all the in-line services present on first service chain 814a including first service 816a ("Service A") and second service 816b ("Service B"). When the first packet of the connection reaches policy controller 818, policy controller 818 informs external PCRF 820 about the new flow. In particular embodiments, this interaction may be implemented using a standard Gx or Rx interface (CCR-I/CCA-I message exchange) or any other custom interface that suits the particular needs. External PCRF 820 replies to policy controller 818 selecting a specific policy to be applied for that particular flow. Policy controller 818 then interacts with internal PCRF 808 to trigger the policy application. This interaction may be implemented using standard interfaces (an Rx interface in this particular example) or a proprietary interface exposed by internal PCRF 808. In the particular example described above, policy controller 818 queries external PCRF 820 when it observes a new flow. This may be referred to as a "pull model." However, in other particular examples a "push model" may be used in which external PCRF 820 is triggered by the third party and informed about a new flow, and external PCRF 820 contacts policy controller 818 to push a new policy rule.

One example use case may include, but is not limited to a situation in which the external third party wants to influence the way other services in the chain are applied. For example, a video optimizer present in the Gi-LAN infrastructure may or may not apply video optimization according to a rule imposed by external PCRF 820. This can be realized by an interaction between the service node and internal PCRF 808, which is in turn driven by external PCRF 820 through policy controller 818. Alternatively, the service node (i.e. the video optimizer) may be directly connected to external PCRF 820.

In another example use case, the external third party wants to change the charging rules for the specific flow. For example, the external third party wants to sponsor the traffic associated with the flow. In still another example use case, policy controller 818 can be used to retrieve information from internal PCRF 808 and provide the information to external PCRF 820. The information may include subscriber identity information, network status information, bearer information etc.

Accordingly, various embodiments of communication system 800 provide for allowing the interaction between an external policy engine controlled by a third party and the operator policy engine on a per-flow basis by means of a service node installed in the Gi-LAN service infrastructure of an operator network.

Various embodiments may provide one or more of the following advantages: allowing a simple and standardized way for a mobile network operator to expose network functionalities to third parties in which third parties are able to enforce complex per-flow policy rules thus changing the way the network treats those flows, and offering new opportunities to monetize the network by operators.

Various embodiments described herein may provide for serving secure socket layer (SSL) optimized content from untrusted caches. In a service routed infrastructure used by a mobile service provider, a chain of services can alter traffic between mobile nodes and remote services. All packets from and to the mobile node may be subjected to one or more of these services. Services may range from mobile line termination, lawful interception, charging, but also application-specific (in-line) services such as Web proxies, TCP optimizers, firewalls and NA(P)T functions.

Web proxies are often utilized for two purposes: (1) content caching in which frequently downloaded content is replicated in the proxy and served directly by the proxy in order to decrease the latency, offload the content server and provide peering cost savings for the content provider; and (2) content optimization in which, for example, video or image compression or reformatting operations are performed more or less aggressively according to various factors including network conditions, such as congestion or radio link quality, device capabilities, such as screen resolution or codec capabilities, and other profile driven decisions. Oftentimes these two purposes are combined.

Lately content providers have started to provide their content using encrypted connections. In particular the most common adopted standards are Secure Socket Layer (SSL) and its successor Transport Layer Security (TLS) which establish an end-to-end encrypted channel between the client and the server. The use of such encryption mechanisms makes it difficult to deploy web proxies for content caching and optimization. In fact a proxy, which represents a man-in-the-middle, needs to have access to the server certificates, as it needs to: (1) decrypt the requests from the client; and (2) encrypt and authenticate the optimized content. This approach is only possible when the content server and the proxy are operated by the same party, and thus the proxy is fully trusted by the content provider. In the scenario described herein, the proxy is hosted in the mobile service provider which is a not fully trusted environment. In particular, the content provider is not willing to install its certificates (including the private keys that prove its identity) in the proxies. In this scenario the use of SSL/TLS prevents the employment of such web proxies and the achievement of the associated advantages for both the mobile service provider and the content provider.

A brief overview of the SSL protocol may be summarized as follows:

1. The server proves its identity by means of a certificate and asymmetric encryption.

2. Client and servers share a master secret using asymmetric encryption mechanisms. During this operation server is authenticated through its certificate.

3. Each side derives univocally from the master secret the following keys:
  a. Client MAC key: used by the client to compute the MAC which authenticates each data packet sent.
  b. Server MAC key: used by the server to compute the MAC which authenticates each data packet sent.
  c. Client encryption key: used by the client to encrypt each data packet sent.
  d. Server encryption key: used by the server to encrypt each data packet sent.
  e. Client Initialization Vector: used by the client to initialize the encryption.
  f. Server Initialization Vector: used by the server to initialize the encryption.

4. Each packet sent by either party is encrypted using the encryption key and the initialization vector and it is authenticated computing a cryptographic digest, termed MAC, using the MAC key.

In an attempt to address the use of untrusted proxies for content caching, the SSL splitting technique has been proposed. However such techniques do not allow for content optimization. Various embodiments described herein provide for allowing the use of proxies for both caching an optimization.

The SSL splitting includes allowing a proxy to have access to the server encryption keys and the initialization vectors, with no access to the server MAC keys or client keys, master secret or certificate. This allows the proxy to encrypt content that is cached locally but prevents the proxy from authenticating it.

The brief overview of the SSL splitting scheme may be summarized as follows:

1. Proxy and servers establish a private SSL channel that will be used for signaling and for sending data in case of cache misses.

2. During SSL handshake between the client and the server, the proxy relays the packets between client and server to establish the SSL session.

3. The server shares server encryption keys and Initialization vectors with the proxy over their private SSL channel.

4. The proxy relays encrypted content requests from the client to the server.

5. For each data packet to be sent to the client, the server only computes the media access control (MAC) address and send it to the proxy, while the proxy encrypts the cached content and send it to the client along with the MACs computed by the server. In case of cache misses the proxy retrieves the content from the server over their private SSL channel.

With this scheme the content provider does not need to share certificates with the proxy while allowing the proxy to serve cached content. As a result the proxy cannot alter the content and cannot maliciously impersonate the server without the help of the server itself.

Figure 9:
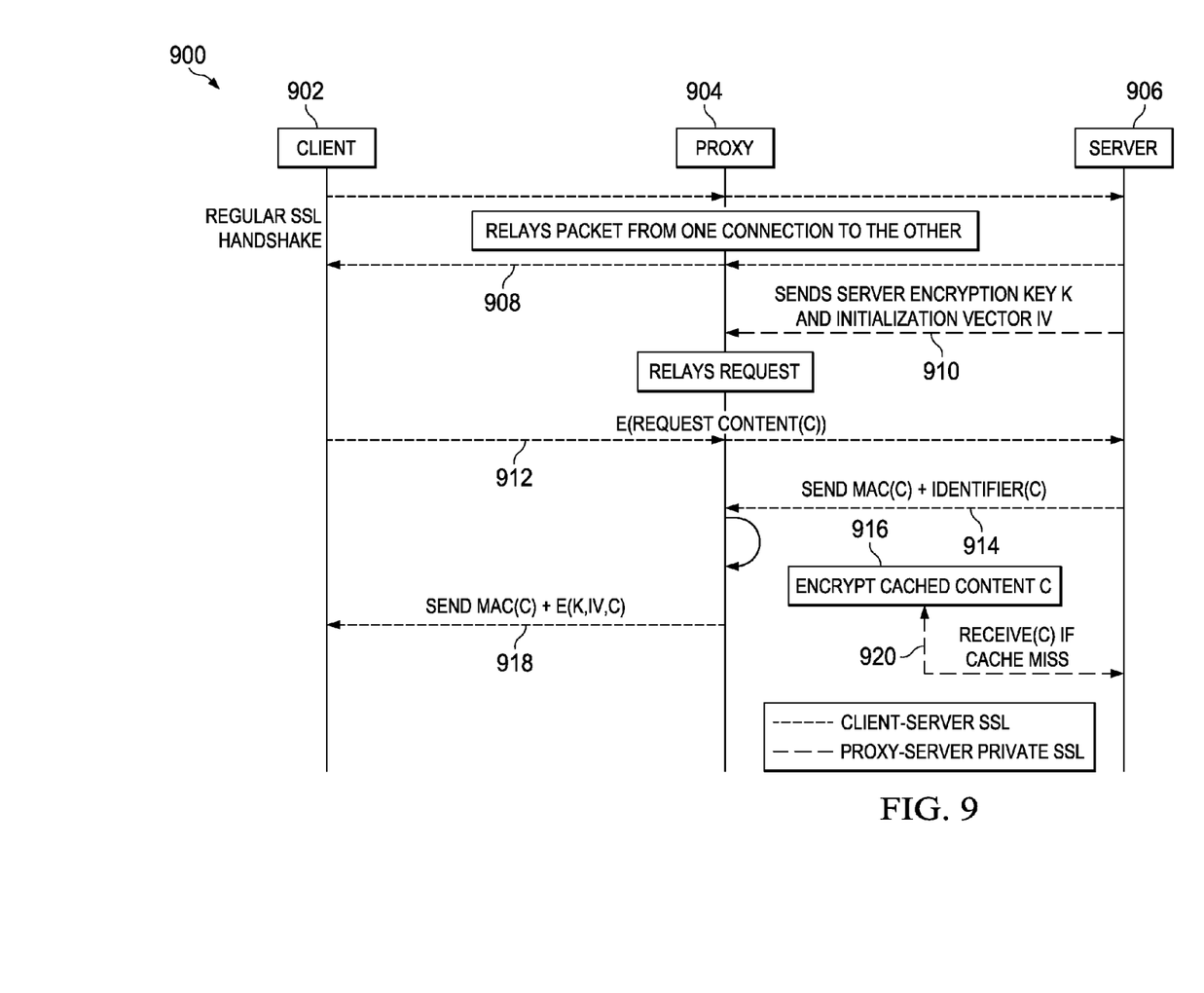
FIG. 9 illustrates an example of a signaling flow for secure socket layer (SSL) splitting.

Referring now to FIG. 9, FIG. 9 illustrates an example of a signaling flow 900 for SSL splitting. The signaling flow is between a client 902, a proxy 904, and a server 906. In 908, client 902 and server 906 establish a regular SSL handshake over client-server SSL connections in which proxy 904 relays packets from one connection to the other. In 910, server 906 sends a server encryption key K and initialization vector IV to proxy 904 over a proxy-server private SSL. In 912, client 902 sends an encrypted content request E(Request Content (C)) to server 906 which is relayed by proxy 904 over the client-server SSL connection. In 914, server 906 sends a MAC address and sends the computed MAC address, MAC(C), and an Identifier (C) to proxy 904 over the client-server SSL connection. In 916, proxy 904 encrypts the cached content C. In 918, proxy 904 sends the computed MAC (MAC(C), encryption key K, initialization vector IV, and encrypted content C to client 902 over the client-server SSL connection. In the case of cache misses, in 920 proxy 904 retrieves the content (C) from server 906 over the proxy-server private SSL.

As described above, the SSL splitting technique does not allow the proxy to alter cached content, as the MAC addresses need to be computed by the server. This implies that the proxy cannot optimize the content. In accordance with various embodiments, an enhancement of SSL splitting is provided to allow optimization. In accordance with one or more embodiments, for each content file server 906 generates a set of optimized versions, where each version is suitable for a particular range of network conditions and client device capabilities. These versions are sent to proxy 904 to populate its cache. In particular embodiments, the cache may be populated in a preliminary phase or upon a specific content request over the private channel between proxy 904 and server 906.

Upon content request, proxy 904 sends current network conditions and client device capabilities to server 906. Server 906 selects the most suitable optimized version to serve based on this information, and computes the MAC addresses for the selected version. Server 906 then sends the MAC addresses for the selection version to proxy 904. At this point, proxy 904 encrypts the optimized cached content and serves it along with the received MACs to client 902. Alternatively, in another embodiment server 906 may notify proxy 904 about the content requested and ask proxy 904 which version to pick given the current network conditions and/or client capabilities.

Figure 10:
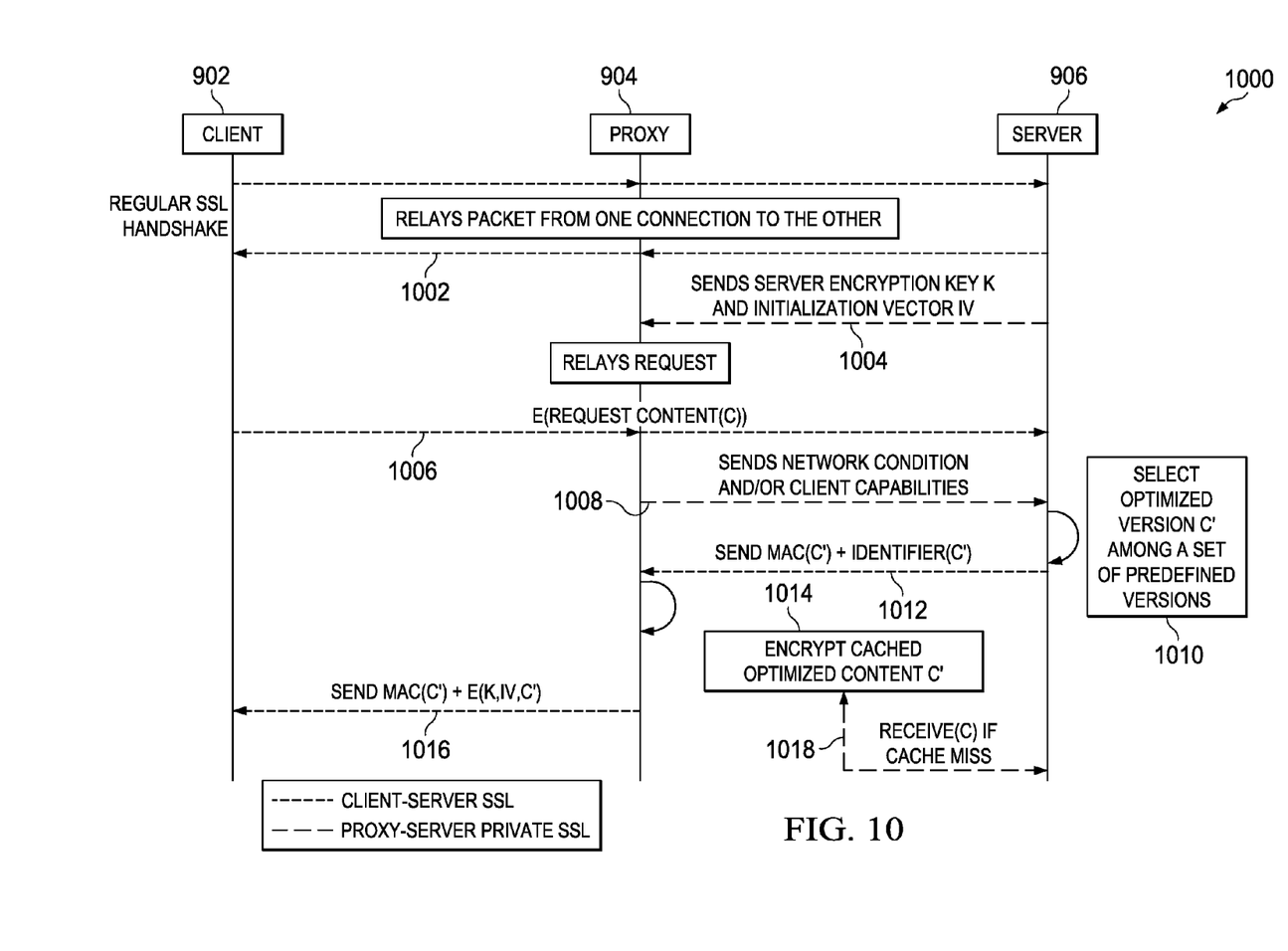
FIG. 10 illustrates an example of a signaling flow for serving SSL optimized content from untrusted caches according to one embodiment.

Referring now to FIG. 10, FIG. 10 illustrates an example of a signaling flow 900 for serving SSL optimized content from untrusted caches according to one embodiment. In 1002, client 902 and server 906 establish a regular SSL handshake over client-server SSL connections in which proxy 904 relays packets from one connection to the other. In 1004, server 906 sends a server encryption key K and initialization vector IV to proxy 904 over a proxy-server private SSL. In 1006, client 902 sends an encrypted content request E(Request Content (C)) to server 906 which is relayed by proxy 904 over the client-server SSL connection. In 1008, proxy 904 sends network conditions and/or client capabilities to server 906 over the proxy-server private SSL connection. In 1010, server 906 selects the most suitable optimized version C' among a set of predefined set of optimized versions to serve based on the network conditions and/or client capabilities information. In particular embodiments, the predefined set of optimized versions may be preliminarily shared by server 906 with proxy 904 to avoid cache misses.

In 1012, server 906 sends a MAC address and sends the computed MAC address, MAC(C') selected from the set of predefined versions, and an Identifier (C') to proxy 904 over the client-server SSL connection. In 1014, proxy 904 encrypts the cached content C'. In 1016, proxy 904 sends the computed MAC (MAC(C')), encryption key K, initialization vector IV, and encrypted content C' to client 902 over the client-server SSL connection. In the case of cache misses, in 1018 proxy 904 retrieves the content (C') from server 906 over the proxy-server private SSL connection.

Accordingly, various embodiments described herein allow an untrusted cache to serve optimized content over an SSL session using SSL splitting. The procedures of one or more embodiments may be summarized as follows:

(1) A content server pre-computes a set of optimized versions for each served content.

(2) The various versions are cached in a web proxy. When a particular content is requested, the web proxy selects according to network conditions and device capabilities which version to serve.

(3) The proxy signals the selection decision to the server, which computes and sends the authentication records (MACs) to the proxy.

(4) The proxy serves the encrypted optimized cached content along with the MACs received applying a SSL splitting scheme Advantages:

Some embodiments described of allowing network operators or any other service provider to provide content optimization and caches by means of web proxies when SSL encryption is used by the content server may provide one or more of the following advantages: (1) the cache does not need access to server certificates and so it has not to be fully trusted by the content provider; (2) the cache is not able to tamper content; (3) the cache is able to serve optimized content based on current network condition and client device capabilities; (4) the content provider saves on peering costs also for encrypted content; (5) the content server is freed of the burden of computing optimized content on the fly.

In regards to the internal structure associated with communication system 200, service provider virtual service infrastructure 202 can include memory elements for storing information to be used in achieving the operations, as outlined herein. Additionally, service provider virtual service infrastructure 202 may include a processor that can execute software or an algorithm to perform the activities as discussed in this Specification. Service provider virtual service infrastructure 202 may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to service provider virtual service infrastructure 202 could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIG. 6] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIG. 6] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array

[FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 200 (and its teachings) are readily scalable and further can accommodate a large number of components, as well as more complicated/sophisticated arrangements and configurations. Accordingly, the examples provided should not limit the scope or inhibit the broad teachings of communication system 200 as potentially applied to a myriad of other architectures.

It is also important to note that the previously described activities illustrate only some of the possible signaling scenarios and patterns that may be executed by, or within, communication system 200. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 200 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 200 may be applicable to other exchanges, routing protocols, or routed protocols. Moreover, although communication system 200 has been illustrated with reference to particular elements and operations that facilitate the communication process, these elements and operations may be replaced by any suitable architecture or process that achieves the intended functionality of communication system 200.

In a separate endeavor, communication system 200 may generally be configured or arranged to represent a 3G architecture applicable to UMTS environments in accordance with a particular embodiment. However, the 3G architecture is offered for purposes of example only and may alternatively be substituted with any suitable networking system or arrangement that provides a communicative platform for communication system 100. Moreover, the present disclosure is equally applicable to other cellular and/or wireless technology including CDMA, Wi-Fi, WiMAX, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a first data packet of a data flow at a first classifier, the first data packet including a first identifier;
   determining, by the first classifier, a second classifier associated with the first identifier, the second classifier being further associated with at least one service chain of a service chain environment; and
   forwarding the first data packet to the second classifier by the first classifier, wherein the second classifier is configured to receive the first data packet, determine a particular service chain of the at least one service chain to which the first data packet is to be forwarded, and forward the first data packet to the particular service chain.

2. The method of claim 1, wherein the second classifier is associated with a third party entity.

3. The method of claim 2, wherein the at least one service chain is private to the third party entity.

4. The method of claim 2, wherein the first identifier is further associated with the third party entity.

5. The method of claim 2, wherein the at least one service chain includes one or more service functions that are private to the third party entity.

6. The method of claim 1, wherein the first identifier is included within a network service header.

7. The method of claim 6, wherein the first identifier is included within a context header of the network service header.

8. The method of claim 1, wherein the first classifier is associated with a service provider.

9. The method of claim 1, wherein the second classifier is further configured to identify a particular application associated with the data flow and forward the data flow to the particular private service chain based upon the identified application.

10. One or more non-transitory media that includes code for execution and when executed by a processor operable to perform operations comprising:
    receiving a first data packet of a data flow at a first classifier, the first data packet including a first identifier;
    determining, by the first classifier, a second classifier associated with the first identifier, the second classifier being further associated with at least one service chain of a service chain environment; and
    forwarding the first data packet to the second classifier by the first classifier, wherein the second classifier is configured to receive the first data packet, determine a particular service chain of the at least one service chain to which the first data packet is to be forwarded, and forward the first data packet to the particular service chain.

11. The media of claim 10, wherein the second classifier is associated with a third party entity.

12. The media of claim 11, wherein the at least one service chain is private to the third party entity.

13. The media of claim 11, wherein the first identifier is further associated with the third party entity.

14. The media of claim 11, wherein the at least one service chain includes one or more service functions that are private to the third party entity.

15. The media of claim 10, wherein the first identifier is included within a network service header.

16. The media of claim 10, wherein the second classifier is further configured to identify a particular application associated with the data flow and forward the data flow to the particular private service chain based upon the identified application.

17. A network element, comprising:
- a memory element configured to store electronic code;
- a processor operable to execute instructions associated with the electronic code;
- a first classifier; and
- a second classifier in communication with the first classifier, the second classifier being further associated with at least one service chain of a service chain environment;

wherein the first classifier is configured to:
- receive a first data packet of a data flow, the first data packet including a first identifier;
- determine the second classifier associated with the first identifier; and
- forward the first data packet to the second classifier; and wherein the second classifier is configured to:
- receive the first data packet;
- determine a particular service chain of the at least one service chain to which the first data packet is to be forwarded; and
- forward the first data packet to the particular service chain.

18. The network element of claim 17, wherein the second classifier is associated with a third party entity.

19. The network element of claim 18, wherein the at least one service chain is private to the third party entity.

20. The network element of claim 18, wherein the first identifier is further associated with the third party entity.

21. The network element of claim 18, wherein the at least one service chain includes one or more service functions that are private to the third party entity.

22. The network of claim 17, wherein the first identifier is included within a network service header.

23. The network element of claim 22, wherein the first identifier is included within a context header of the network service header.

24. The network element of claim 17, wherein the first classifier is associated with a service provider.

25. The network element of claim 17, wherein the second classifier is further configured to:
- identify a particular application associated with the data flow; and
- forward the data flow to the particular private service chain based upon the identified application.

* * * * *